J. S. WALCH.
FEEDER FOR THRESHING MACHINES.
APPLICATION FILED FEB. 13, 1909.
967,690.
Patented Aug. 16, 1910.
3 SHEETS—SHEET 3.
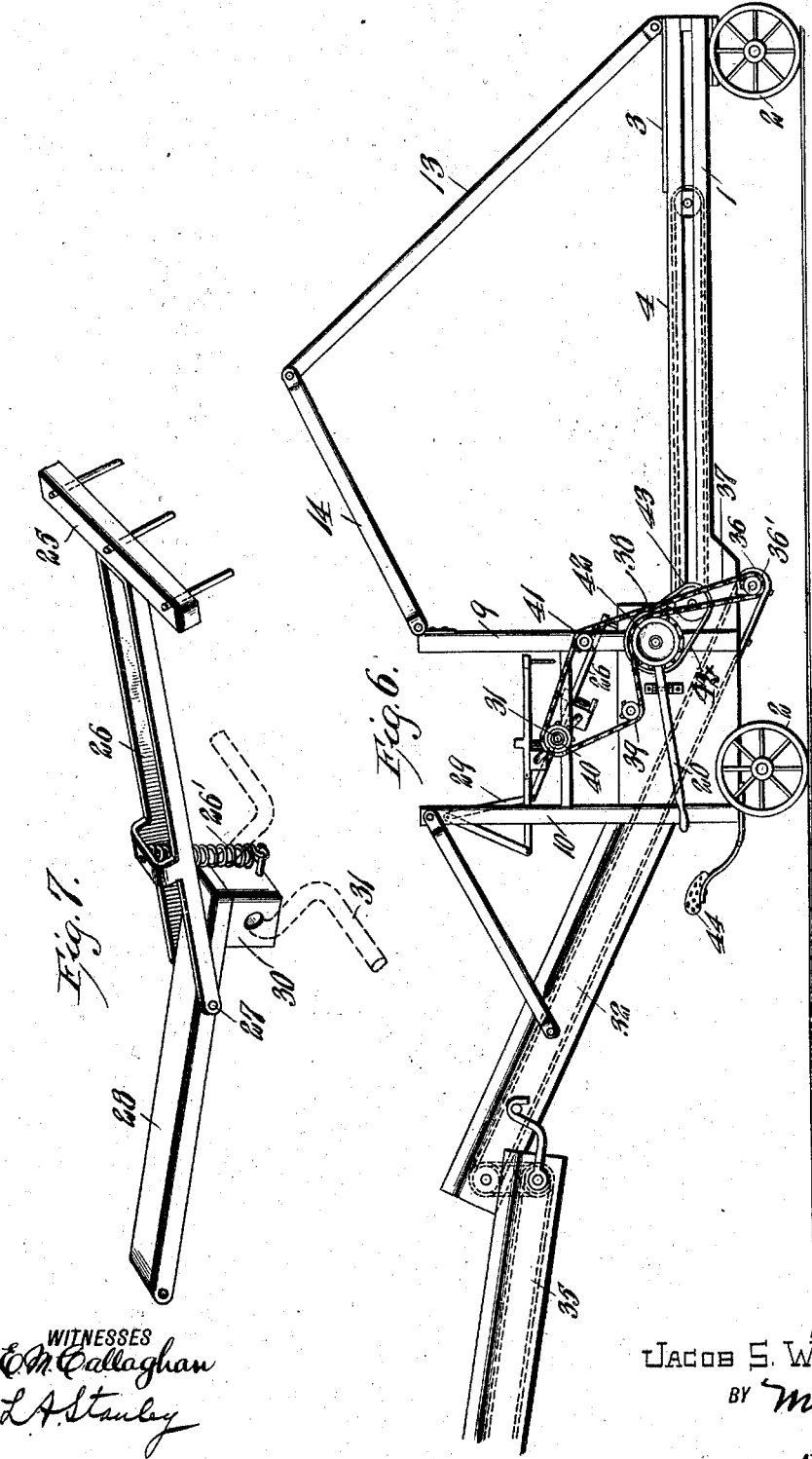
WITNESSES
E. M. Callaghan
L. A. Stanley
INVENTOR
Jacob S. Walch
BY Munn & Co.
ATTORNEYS

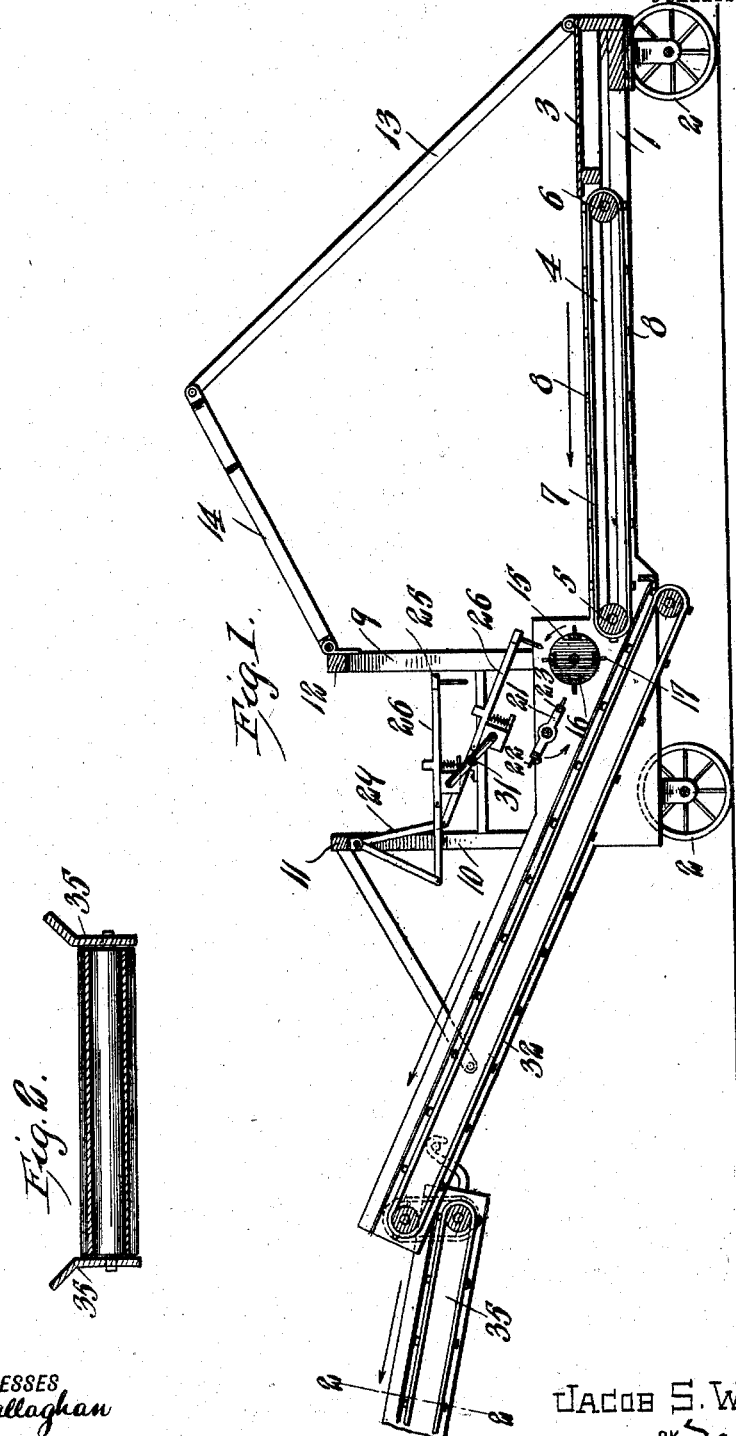

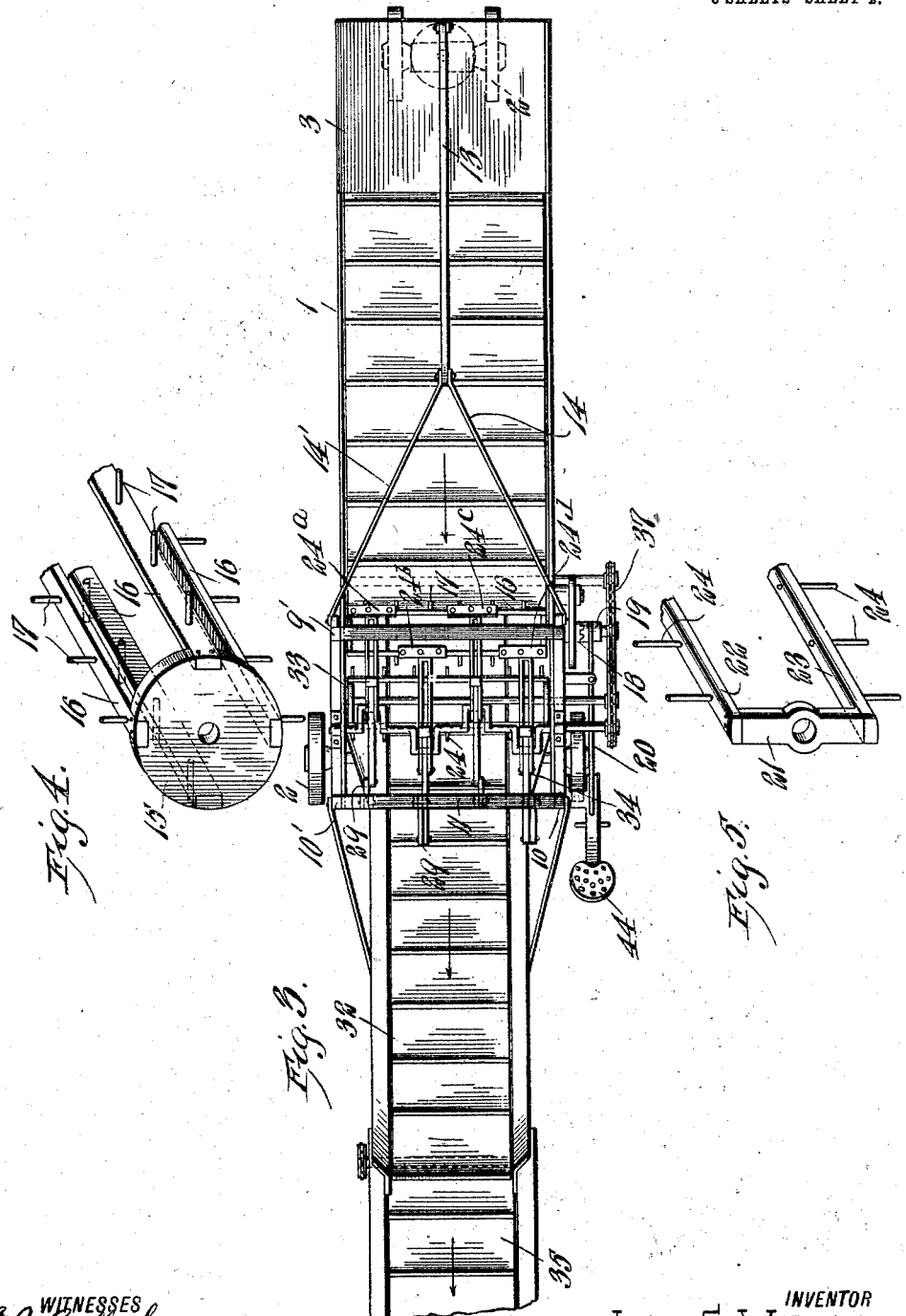

UNITED STATES PATENT OFFICE.

JACOB SLAIN WALCH, OF WALLA WALLA, WASHINGTON, ASSIGNOR TO WALLA WALLA IRON WORKS, OF WALLA WALLA, WASHINGTON, A CORPORATION OF WASHINGTON.

FEEDER FOR THRESHING-MACHINES.

967,690.  Specification of Letters Patent.  Patented Aug. 16, 1910.

Application filed February 13, 1909. Serial No. 477,555.

*To all whom it may concern:*

Be it known that I, JACOB SLAIN WALCH, a citizen of the United States, and a resident of Walla Walla, in the county of Walla Walla and State of Washington, have made certain new and useful Improvements in Feeders for Threshing-Machines, of which the following is a specification.

My invention relates to improvements in devices for threshing of grain and it consists in the combinations, constructions and arrangements herein described and claimed.

An object of my invention is to provide a device in which the threshing of stacked loose grain or with grain in bundles in the field may be accomplished with less difficulty than with the ordinary machine.

A further object of my invention is to provide a device which may be used in connection with a threshing machine to feed the grain uniformly into the cylinder of the machine, thereby preventing the clogging of the latter and the consequent annoyance and inconvenience resulting therefrom.

A further object of my invention is to provide novel means by which the feeding of the grain may be accomplished with uniformity and precision.

Other objects and advantages will appear in the following specification and the novel features of the device will be particularly pointed out in the appended claims.

My invention is illustrated in the accompanying drawing, in which—

Figure 1 is a longitudinal sectional view showing one embodiment of my invention. Fig. 2 is a detail section of one of the carriers. Fig. 3 is a plan view of the device. Fig. 4 is a detail view in perspective of the retarding device. Fig. 5 is a detail view in perspective of the beater. Fig. 6 is a side elevation of the device, and Fig. 7 is a detail view in perspective showing the construction of one of the rakes.

In carrying out my invention I provide a bed frame 1 mounted upon wheels 2. At one end of the frame I arrange a table 3 which is raised slightly above an endless carrier 4, the latter being mounted on the rollers 5 and 6 as shown in the drawing. This carrier may be one of a number of forms, but preferably consists of a flexible body portion 7 with transverse slats or ribs 8 secured thereto.

Secured to the bed frame 1 is a supporting frame comprising the uprights 9—9' and 10—10'. The uprights 10—10' are connected by means of a cross member 11, while the uprights 9—9' are similarly connected by a cross member 12. A center brace 13 is connected with two inwardly extending braces 14 and 14' connected with the uprights 9 and 9' as shown in the drawing. Mounted within the frame is a retarding device shown in detail in Fig. 4. This consists of the circular end plates 15—15', to which are attached the four cross members 16, bearing the laterally projecting pins 17. The retarding device is journaled within the frame and is provided with a clutch member 18, arranged to coact with a slidable clutch member 19 operated by the lever 20.

The beater consists of a device somewhat similar to that of the retarder, having the heads 21 and 21' and connecting cross members 22 and 23 provided with laterally extending arms 24. The latter are longer than the pins on the retarder and serve the purpose of thoroughly loosening up the grain.

Arranged to coöperate with the retarder and beater are the rakes $24^a$, $24^b$, $24^c$ and $24^d$. While I have shown four of these rakes it will be understood that any convenient number may be used. The form of these rakes is shown in detail in Fig. 7. They consist of a head 25 provided with teeth the said head mounted upon an arm 26 which is pivotally attached at 27 to a reciprocating member 28. The latter is pivotally connected by means of the link 29 to the cross bar 11, as plainly shown in Fig. 1. Referring again to Fig. 7, it will be seen that the member 28 has upon one end a boxing 30 arranged to receive a portion of the crank shaft 31. Attached to the boxing is a spring 26', which is also secured to the arm 26 which bears the rake. In the drawing I have shown alternate rakes as being in the same relative position, adjacent rakes being in opposed positions. To this end the crank shaft 31 is bent rearwardly for one rake and forwardly for the adjacent rake.

Extending rearwardly at an incline is a second carrier 32, which is similar in construction to the carrier 4 but is narrower than the latter. The converging side members 33 and 34 concentrate the loose grain coming from the beater into the carrier 32.

At the end of the carrier 32 is a third carrier 35, which is intended to deliver grain into the cylinder of the threshing machine.

Referring now to Fig. 6 it will be seen that the drive wheel is underneath the device as shown at 36. The sprocket chain 37 passes over the sprocket wheel 36' on the drive wheel shaft, thence over the sprocket wheel 38 on the shaft of the retarder, thence under the sprocket wheel 39 on the shaft of the beater, thence over the sprocket wheel 40 of the crank shaft 31, thence over the idler 41 and back around the sprocket 36'. Secured on the same shaft with the sprocket 38 is a sprocket 42 which drives a sprocket 43 on the end of the shaft 5 (which bears the carrier 4) by means of a short sprocket chain 42$^x$.

It will be noted that the axis of the retarder is above the surface of the carrier so that with the retarder revolving in the direction indicated by the arrow, the fingers on the lower side of the retarder tend to oppose the movement of the grain coming from the carrier.

From the foregoing description of the various parts of the device the operation thereof will be readily understood.

The apparatus is used in connection with a thresher as has been before stated. The operator may take his position in the seat 44 in a convenient position to the lever 20. The device may be started by operating the clutch mechanism as already described. As the grain comes from the table 3 it is picked up by the carrier 4 and delivered to the retarding device. The rotation of this member in the direction shown by the arrow tends to retard the grain and to carry it backward and upward into the path of the reciprocating rakes. The latter members are reciprocated through the action of the crank shaft which raises them in going forward and lowers them so that they catch the grain and draw it forward on to the beater. The springs 26' are provided in order that the rake shall not take up too large a charge. Normally the springs 26' hold the rake down, but when the charge is too large the rake head will be pressed up and when it is brought forward will always carry with it a bundle of a certain size. Thus it will be seen that with a plurality of these rakes the grain will be fed uniformly to the beater. This device tends to loosen up the grain still further and to feed it regularly to the traveling carrier 32, which delivers it to the end carrier 35.

I claim—

1. In a grain feeder for threshing machines, an endless carrier, a rotatable retarding device mounted near one end of said carrier, the axis of said retarding device being above the surface of the carrier, said retarding device being provided with a series of fingers arranged to engage the grain delivered from the carrier, a plurality of spring controlled reciprocating rakes adapted to draw forward uniform charges, and a beater arranged to receive said charges and feed the same forwardly.

2. A grain feeder for threshing machines, an endless carrier, a retarding device for retarding the grain delivered by said carrier and for an accumulated charge, a crank shaft, a plurality of reciprocating rakes adapted to draw forward uniform charges, said rakes comprising a pivoted member provided with a boxing arranged to receive the crank shaft, an arm secured to said pivoted member between said boxing and the pivoted connection of the member and a spring secured to said boxing and to said arm.

3. In a grain feeder for threshing machines, a frame, a crank shaft mounted thereon, a swinging member secured to said frame, a pivoted bar secured to said swinging member at its lower end, said bar being provided at its free end with a boxing arranged to receive a portion of the crank shaft, an arm pivotally secured at one end to said pivoted bar between the boxing and the pivotal connection with said swinging member, said arm being provided with teeth at its free end and a spiral spring connecting said boxing with said arm.

JACOB SLAIN WALCH.

Witnesses:
 JOHN WATSON BROOKS,
 CYRUS M. BRYANT.